United States Patent [19]
Davenport et al.

[11] Patent Number: 5,199,091
[45] Date of Patent: Mar. 30, 1993

[54] ARRANGEMENT AND A METHOD FOR COUPLING A LIGHT SOURCE TO A LIGHT GUIDE USING A SOLID OPTICAL COUPLER

[75] Inventors: John M. Davenport, Lyndhurst, Ohio; William W. Finch, Ann Arbor, Mich.; Richard L. Hansler, Pepper Pike, Ohio; John L. Henkes, Latham, N.Y.; Kenneth S. King, Willoughby Hills, Ohio

[73] Assignee: General Electric Company, Schenectady, N.Y.

[21] Appl. No.: 806,381

[22] Filed: Dec. 13, 1991

[51] Int. Cl.$^5$ ................................. G02B 6/26
[52] U.S. Cl. ........................ 385/39; 385/50; 385/51
[58] Field of Search ............. 385/31, 39, 50, 51, 385/15

[56] References Cited
U.S. PATENT DOCUMENTS

| | | | |
|---|---|---|---|
| 4,097,118 | 6/1978 | Hammer | 385/50 X |
| 4,423,923 | 1/1984 | Frazier et al. | 385/51 X |
| 4,478,484 | 10/1984 | Pratt, Jr. | 385/15 X |
| 5,028,110 | 7/1991 | Plummer | 385/39 X |

Primary Examiner—John D. Lee
Assistant Examiner—S. Barns
Attorney, Agent, or Firm—George E. Hawranko; Stanley C. Corwin

[57] ABSTRACT

A light coupling arrangement for efficiently coupling a light source to a light distribution arrangement includes a solid optical coupling device constructed of a light transmissive material and configured in an essentially planar manner such that the length and width dimensions are significantly greater than the depth dimension. An aperture is formed on at least one side along the equatorial surface of the optical coupling device and allows connection to the light distribution arrangement. A bore, formed in the optical coupling device and having a flat polished surface, houses the light source in a manner such that the optical coupling device can act as a heat sink for the light source.

18 Claims, 5 Drawing Sheets

ARRANGEMENT AND A METHOD FOR COUPLING A LIGHT SOURCE TO A LIGHT GUIDE USING A SOLID OPTICAL COUPLER

FIELD OF THE INVENTION

This invention relates to an arrangement and a method for coupling a light source to a light guide using a solid optical coupling device. More particularly, this invention relates to such a solid optical coupling arrangement wherein the light source is cooperatively associated with a particular surface of an essentially two-dimensional solid optical coupling device in a manner so as to optimize the collection efficiency between the light source and the light guide.

BACKGROUND OF THE INVENTION

The design of optical transmission schemes for transmitting the output of a light source through light guides, light pipes, or optical fibers, has as its principle aim, the optimization of light collection efficiency at the light source and the subsequent coupling of such light output to the light distribution medium with as little light loss as possible. Given that the light output from the light source generally spreads out in a spherically radiating manner; that is, at a large angle from the source, one might consider that the optimum approach for collecting such light output for distribution would be to partially surround such light source with a somewhat equally spherically shaped collecting device such as a reflector for instance. One such example of a reflector used to collect the light output of a light source can be found in U.S. Pat. No. 4,811,172 issued to Davenport et al. on Mar. 7, 1989 and assigned to the same assignee as the present invention. Though this approach has demonstrated an improved efficiency in coupling an amount of light output to a bundle of optical fibers for distribution to locations remote from the light source, the use of such a reflector, light source arrangement experiences an inherent limitation to the level of improvement in efficiency. Specifically, because there is a measurable distance between the light source and the reflector, there is some opportunity for the light to be lost or scattered. Additionally, absent a total internal reflection arrangement, in a light collecting or directing arrangement which utilizes a principally reflecting scheme, it is known that some of the light rays will be reflected more than once which has the inherent disadvantage that with each reflection, some loss of light occurs, such loss typically being in the range of about 10%.

Another approach to efficiently coupling a light guide to a light source would be to conform the light guide to the shape of the light source outer envelope and permanently adhere the light guide to the light source. An approach illustrating the use of a cylindrical quartz rod fused to the surface of the light source can be found in U.S. Pat. No. 4,958,263 issued to Davenporr et al on Sep. 18, 1990 and assigned to the same assignee as the present invention. Though a more efficient means of coupling the light source output to the light guides than some previously taught techniques, it has been found that some light is lost by conforming the shape of the input face of the optical coupler to the surface of the light source. Furthermore, such an approach may be costly to implement in that the operation of fusing the quartz rod to a surface of the light source requires an additional manufacturing step than does the approach wherein the optical coupling device is merely positioned in proximate relation to the light source.

Still another approach to providing a light source and optical coupling arrangement aimed at achieving a high light collection efficiency can be found in U.S. Pat. No. 4,002,499 issued to R. Winston on Jan. 11, 1977. This patent provides for a three-dimensional, primarily cylindrically shaped solar energy concentrator which is more directed to the task of collecting light input rather than distributing light output and as such, emphasis is more directed to the geometry of the compound parabolic collector (CPC) than the relationships between the light source, the optical coupling device and the light distribution means such as fiber optics or other light guides. Furthermore, because of the 3-dimensional size and shape characteristics of this device, applications requiring that the light source, light coupling arrangement occupy as small a space as possible, would be precluded from consideration.

SUMMARY OF THE INVENTION

The present invention provides an arrangement for optically coupling the light output of a light source to a light distribution means in as efficient a manner as possible by use of an optical coupling arrangement wherein the light source and the optical coupling device may be in proximate relation to one another such that the optical coupling device can act as a heat sink for the light source thus permitting increased power loading of the lamp. Additionally, this invention can also provide such an optical coupling arrangement wherein a portion of the opening formed in the optical coupling device to accept the light source also forms a part of the light source such that the light output is more directly coupled to the optical coupling device.

In accordance with the principals of the present invention, there is provided an arrangement for coupling light output from a light source to a light distribution means which includes a solid optical coupling element constructed of a material having a high transmittance value in the visible region. The solid optical coupling element can be configured in a shape such that the length and width of a first surface are substantially greater than the depth of such solid optical coupling device; in other words, the optical coupling device can be configured in an essentially planar manner. An aperture is formed in the side of the solid optical coupling device to allow for the communication of light output to the light distribution means. A bore is formed within the solid optical coupling device and is sized in such a manner that the light source can be disposed therein in a contacting manner to the inside surface of such bore. This contacting relation allows the optical coupling device to act in a heat sinking manner for the light source. The inside surface of the bore formed in the optical coupling device can be polished so as to allow maximum light transmittance from the light source to the optical coupling device.

In a variation of the optical coupling arrangement of the present invention, the light source can be so integrally associated with the optical coupling device as to share a common boundary; that is, the light source can be constructed merely by securing end portions holding electrodes therein above and below the bore formed in the optical coupling device and allowing the arc discharge to occur within the bounds formed internally of the bore in the solid optical coupling device.

BRIEF DESCRIPTION OF THE DRAWINGS

For a better understanding of the invention, reference may be had to the following detailed description taken in conjunction with the accompanying drawings in which.

DESCRIPTION AND OPERATION

Figure 1:
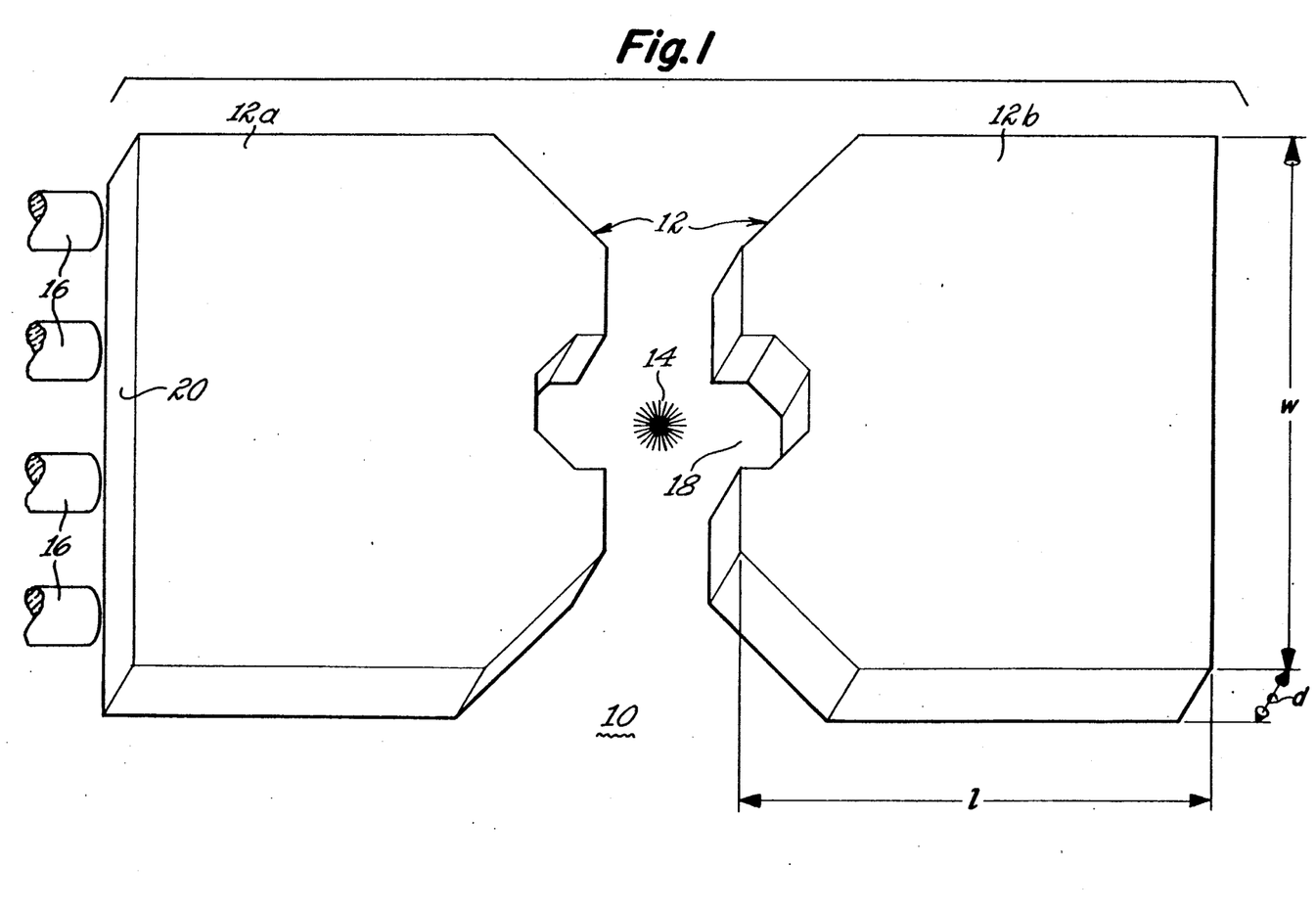
FIG. 1 is a perspective view of an optical coupling arrangement constructed in accordance with a first embodiment of the invention.

Referring to FIG. 1, there is shown an optical coupling arrangement 10 for efficiently coupling light output to a point remote from the light source having essentially a solid optical coupling device 12 shown here as consisting of two halves 12a and 12b, a light source shown generally as reference 14, and a light distribution device shown as reference numeral 16. It can be appreciated that the light source 14 and the light distribution device 16 are shown in a representational manner and can in fact be supplied using any number of different approaches all of which are contemplated by the present invention. For instance, the light source 14 can be provided in the form of a discharge type of lamp such as a metal halide lamp, or in the form of certain types of incandescent lamps as well. Additionally, as for the light distribution element, it can be appreciated that such feature can be accomplished equally as well using optical fibers, light guides, light pipes, and the like.

The solid optical coupling device 12 can in the first embodiment be comprised of two half portions 12a and 12b which are mirror images of one another and are constructed of the same material. The solid optical coupling device shown in FIG. 1 and variations of this configuration which are illustrated in the following drawings as will be discussed hereinafter in further detail, are constructed of a material having a high transmissivity value in the visible region, preferably such transmissivity value being greater than 0.9. An additional quality of such optical coupling device material is that the material must be capable of performing continuously at higher temperatures such as for instance, at temperatures between 800° C. and 1500° C. The performance of this material within this temperature range is at least partly dependent on the shape of the optical coupling device 12 and whether the light source 14 will be in physical contact with the optical coupling device 12. Some examples of materials that will meet the necessary performance criteria are quartz, a high-temperature glass or a single crystalline alumina ceramic material.

The separate half configuration 12a, 12b for the optical coupling device 12 shown in FIG. 1 merely illustrates one approach to manufacturing this component of applicants' invention. In actual operation, the two halves 12a and 12b will be joined together so that a bore 18 is formed in surrounding relation to the light source 14. Once combined, the bore 18 formed within the optical coupling device 12 can be of a variety of different shapes, for instance, as illustrated in FIG. 1, the bore 18 is hexagonally shaped, however, it can be appreciated that the bore 18 can also function in the intended manner if it were circularly or otherwise shaped. The inside surface of the bore 18 can be seen to be formed in a straight manner and perpendicular to the plane formed by the top or bottom surface of the optical coupler device 12; that is, from the top to the bottom of the optical coupling device, there is no curvature to the inside surface of the bore 18.

The optical coupling device 12 can be formed from a plate of either of the above materials and is formed in essentially a planar manner. As seen in FIG. 1, the optical coupling device is constructed so that the thickness of such device 12, as shown by reference d in this figure, is substantially smaller than the length and width dimensions of device 12 shown respectively in FIG. 1 as references 1 and w. Constructed in this planar manner and because the light source 14 is disposed within the smaller plane perpendicular to the surface plane, the light output from the light source 14 will travel through the optical coupling device 12 and exit from one or more specified surfaces which are designated apertures 20 shown in FIG. 1 as occurring at opposite ends of the optical coupling device 12. With the depth dimension d corresponding to the Z-axis of a three-dimensional coordinate system, it can be seen that the optical coupling device 12 is essentially flat in the Z-axis whereas this device 12 is shaped in an optically cylindrical manner relative to the x and y axis corresponding to dimensions 1 and w. It can be appreciated that the configuration of the aperture 20 will be largely dependent upon the light acceptance cone (not shown) associated with the light guide 16. By the term "acceptance cone", it is meant to refer to that region or area associated with the light guide 16 which accepts the light from the optical coupling device 12 whether such region or area is directly adjacent the light guide or whether there is some displacement therebetween such that there is some spread in the light output from the aperture 20 before such light output reaches the light guide 16. As an example of an acceptance cone region of a light guide arrangement, reference is made to pending U.S. Pat. No. 5,058,985, Dated Oct. 22, 1991, and assigned to the same assignee as the present invention, such patent being hereby incorporated by reference.

As can be seen in FIG. 1 the optical coupler device essentially collects light from the light source disposed inside the bore over a large angle of 360 degrees through the entire surface area of the bore so that light from the bore is transmitted through each leg of the optical coupler over 180 degrees. The light exits each leg of the optical coupler through a larger surface area defined by the aperture but at an angle significantly less than the original 180 degrees it entered each leg of the optical coupler. Based on the invariance principle in light optics where an inverse relationship exists between the area and the angle formed by a light beam, it is obvious to one skilled in the art that since the area of the aperture in each leg is greater than that of half the bore area, as is shown in FIG. 1, then the light exiting the aperture will do so at a smaller angle than that at which it entered each leg through the bore surface. Hence the depth is substantially smaller than the length and width of the optical coupler. Therefore the surface area of the aperture, and hence the angle formed by the beam exiting the aperture is determined by the width, w, of the optical coupler of FIG. 1. In this way the spread of the beam exiting the aperture may be controlled by varying the width, w, to suit the requirements or the "cone of acceptance" of the light transmitting arrangements. For instance, in light applications that require a narrow focused beam of light such as in forward lighting for automobiles a beam with a spread within 30 degrees of the normal to the aperture is desirable.

In performing the function of directing the light from the light source 14 within the optical coupling device 12, there are essentially two techniques utilized, preferably in combination, however, it can be appreciated that a configuration of the optical coupling device can be provided whereby only one or the other of the internal light directing techniques is utilized, such a variation in the optical coupling device being contemplated as within the scope of the present invention. The two techniques utilized are: one, the cutting of the light transmissive material into a particular shape to optimize the shape to produce total internal reflection within of the optical coupling device 12, and secondly, the addition of a reflective coating such as a metallized or multi-layered interference coating for those designs of which certain surfaces are not at the proper angle to the light rays to produce total internal reflection. The reflective coating would be applied for instance on a corner portion of the optical coupling device 12 since, as a result of the process of cutting the light transmissive material to form the optical coupling device 12 in the desired shape, this portion would not possess the internal reflection properties of the remaining outer surfaces of the coupling device 12. The reflective coating applied must have a high reflectivity in the visible region as seen from within the optical coupling device 12 and furthermore, such coating must also be capable of operation in the temperature range of about 300° C. to about 800° C. depending on the configuration of the optical coupling device 12 and the proximity of the coating material to the light source 14.

In the construction of the optical coupling device 12, although the shape may vary over a range of possible configurations as depicted in FIGS. 2 through 8, and therefore, the internal reflectance properties of the particular shape and the amount of coating necessary can also vary, all designs of the optical coupling device 12 of the present invention require the provision that the bore 18 in which the light source 14 is disposed, have a polished surface in order to minimize losses. For this same purpose, all optical coupling device 12 outside surfaces must be optically clear whether by a polishing, cutting, drawing or other process.

Figure 3:
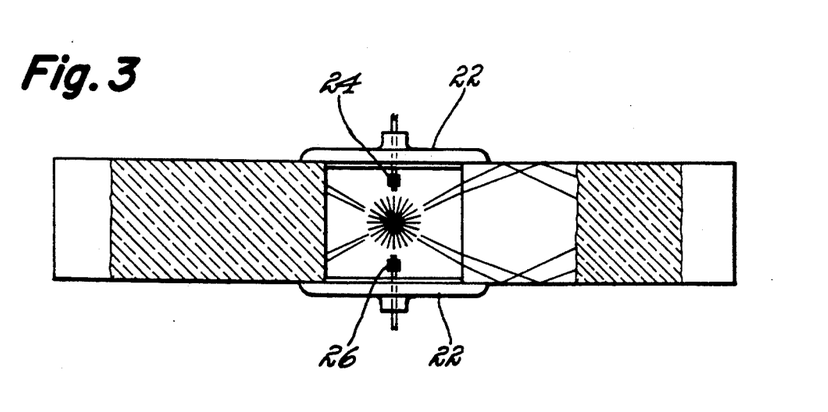
FIG. 3 is a sectional view taken along lines 3—3 of the optical coupling device illustrated in FIG. 2.

Referring again to the polished inside flat axial surface of the bore 18 formed in the solid optical coupling device 12 and more specifically, the manner in which the light source 14 interacts with such flat axial surface, as best shown in FIG. 3, it can be seen that the light loss through the top surface of the solid optical coupling device 12 is reduced due to the fact that the light output is refracted at the flat axial surface of the bore 18 and totally internally reflected at the flat upper and/or lower surface of the coupling device 12. In other words, the light output is first refracted by the flat axial surface of the bore 18 such that the light ray internally of the optical coupling device 12 strikes the upper or lower surface of this device 12 at an incident angle reduced from that which would occur if the bore surface were curved allowing light rays to strike the upper or lower surfaces unrefracted. In measurements conducted using the two-sided solid optical coupling device 12 shown in FIG. 1, the efficiency of the light coupling can be seen in the following Table 1.

TABLE 1

| Solid Coupler | Leg | Spherical Candela | Lumens (SC dl × 4π) | Lumens per mm² | Efficiency (1675 L) |
|---|---|---|---|---|---|
| 2 Sided | 1 | 38.8 | 488 | 3.7 | 29% |
|  | 2 | 39.4 | 495 | 3.8 | 30% |
|  | TOT | 78.2 | 983 |  | 59% |
|  | AVE | 39.1 | 492 | 3.7 | 29% |

As previously discussed, the light source 14 can be disposed within the optical coupling device 12 such that the arc tube or lamp envelope of such light source is in thermal contact with the coupling device 12 thereby allowing such coupling device 12 to act as a heat sink for the light source 14. An alternate arrangement would be to combine of the arc tube with the inner surface of bore 18 such that bore 18 acts as the envelope in which the light output is generated. For instance, if an arc discharge lamp were utilized as the light source, the arc discharge could take place within the confines of the bore inner surface walls. Of course, with such an arrangement, it can be appreciated that the electrodes which supply the energization for the arc discharge to occur must be sealed to the upper and lower surfaces of the optical coupling device 12. As best illustrated in FIG. 3, two opposing ends 22a, 22b can be adhered to the respective upper and lower surfaces of the optical coupling device 12 and respective first and second electrodes 24,26 can be disposed within such ends to allow for the energization of the arc discharge within the inner surface walls of the bore 18.

The bulb form of this light source arrangement can be cylindrically shaped with an outside diameter such that a thermal contact with the solid optical coupling device 12 results. The improved heat sinking by the contact between the light source 14 and the optical coupling device 12 will permit an increased power loading of the light source 14. If the light source 14 were of a compact metal halide type for instance, the result would be an increased brightness (lumens) of the light source 14. An additional benefit to the heat sinking feature achieved by increasing the diameter of the light source 14 so that it is disposed in contacting relation to the optical coupling device 12 is that the optical coupling is improved because of the closer proximity of the light source 14 to the optical coupling device 12. It has been found that for a 3 mm inside diameter tube with 2 mm arc gap, more than 75% of the light will be collected.

In the instance where the light source 14 is in contact with the optical coupling device 12, the extent of the heat sinking operation is determined by the amount of the light source 14 surface area which is in contact with the inner surface of the bore 18. The optimum thermal coupling is achieved by using a light source 14 with a cylindrical bulb form sized to conform substantially to the inner cylindrical dimension of the bore 18. By designing a lamp arc tube (not shown) so that when the loading of the light source 14 is sufficiently high so as to cause the arc tube to bulge if operated in an open environment, when placed in the bore 18 for operation, any portion of the arc tube which is not in thermal contact with solid optical coupling device 12, will bulge until such thermal contact is achieved.

Although the hereinbefore discussion has been directed to the thermal conduction characteristics achieved either by disposing a light source in contact with the bore of the solid optical coupling device 12 or by having the bore 18 form a portion of the light source 14, it can be appreciated that a significant thermal conduction characteristic will be achieved merely by placing the light source in a non-contacting yet close proximity to the inner surfaces of the bore 18. It is contemplated that such a modification is within the scope of the present invention.

Figure 2:
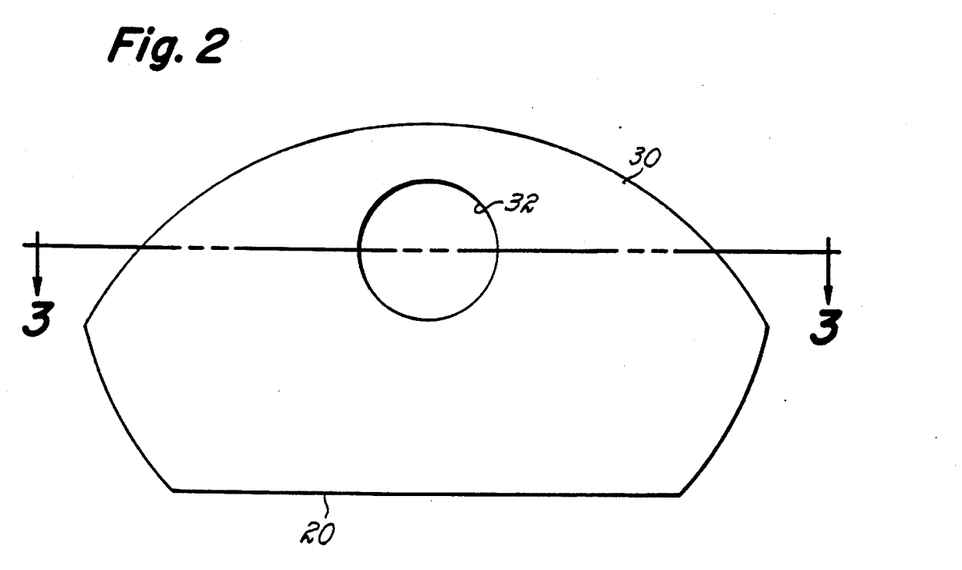
FIG. 2 is an elevational view of an optical coupling arrangement constructed in accordance with a second embodiment of the invention.

Referring now to FIG. 2, it can be seen that an alternate embodiment of the invention is provided in the form of an optical coupling device 30 having parabolic outer surfaces on a substantial portion of the equatorial dimension and a flat surface on the front portion thereof, such flat surface serving the purpose of the aperture 20 similar to that of FIG. 1. It is intended that in addition to the parabolic shape, this invention would prove equally effective for an ellipsoidally shaped coupling device. It will be noted that with the configuration shown in FIG. 2 utilizing parabolic surfaces, the bore 32 in which the light source 14 is disposed, is not in the center position as it was in FIG. 1, but is located at that position which allows for the optimum total efficiency of the optical coupling device 30. In this instance, the optimum position of the bore 32 is approximately at the optical focal point of the parabolic surface opposite the aperture 20. In addition to the parabolic surface of the optical coupler element 30 of FIG. 2, along the sides of this device 30, the surfaces are formed in a spherical manner so that light striking the spherical surface will be reflected back to the parabolic surface and then out through aperture 20. The bore 32 of FIG. 2, though shaped in a circular manner distinct from the hexagonal shape of the bore 18 of FIG. 1, still maintains the flat axial surface configuration as previously pointed out with reference to bore 18. A further distinction between the optical coupling device 12 of FIG. 1 and that of FIG. 2 is that the optical coupling device 30 of FIG. 2, by utilizing the multiple parabolic surfaces (rear and side) reduces the need for adding reflective coating materials to a significant number of corner portions. A measurement of the performance characteristics, particularly the efficiency of the parabolic shaped optical coupling device 30 is illustrated in the following Table 2.

TABLE 2

| Solid Coupler | Sperical Candela | Lumens (SC dl × 4π) | Lumens per mm² | Efficiency (1675 L) |
|---|---|---|---|---|
| Parabolic (FIG. 2) | 42 | 528 | 4 | 32% |
| Simple-1 (FIG. 4) | 51 | 641 | 4.9 | 38% |

As further seen in the measurements listed in Table 2, in addition to the parabolic shaped optical coupling device of FIG. 2, it is possible to achieve the improved coupling efficiency between the light source 14 and the light distribution arrangement 16 by various other shaped coupling devices shown respectively as references 40 and 50 in FIGS. 4 through 8.

Figure 4:
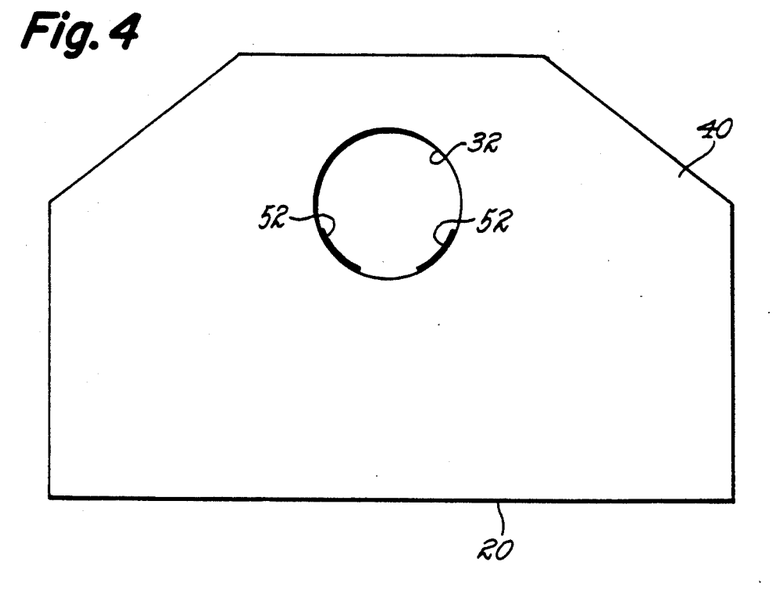
FIGS. 4 through 8 are elevational views of optical coupling arrangements constructed in accordance with various other embodiments of the invention.
Figure 5:
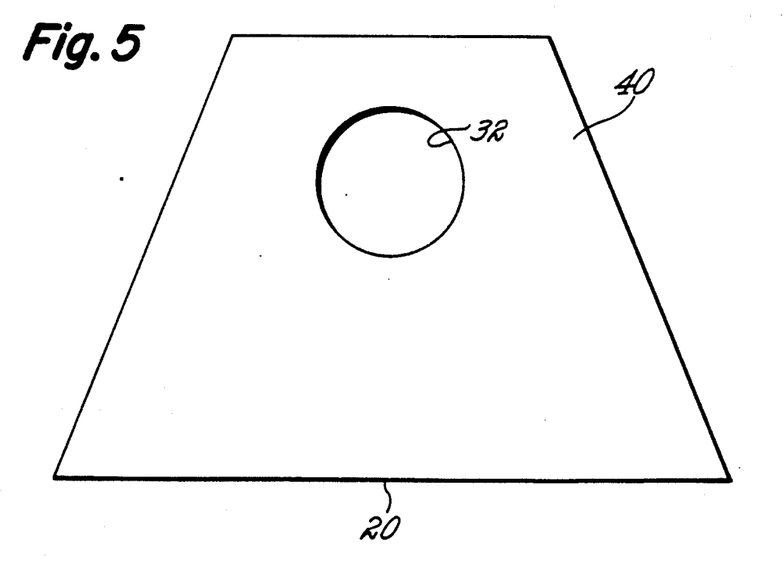
Figure 6:
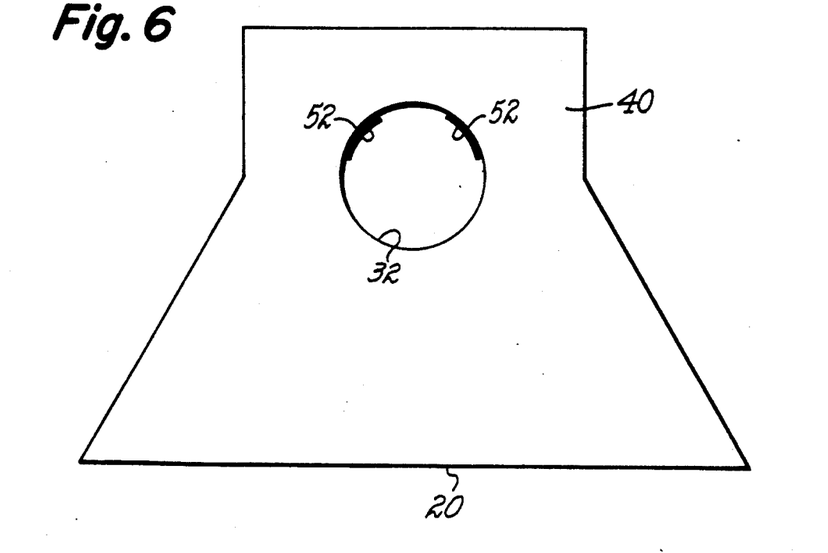
Figure 7:
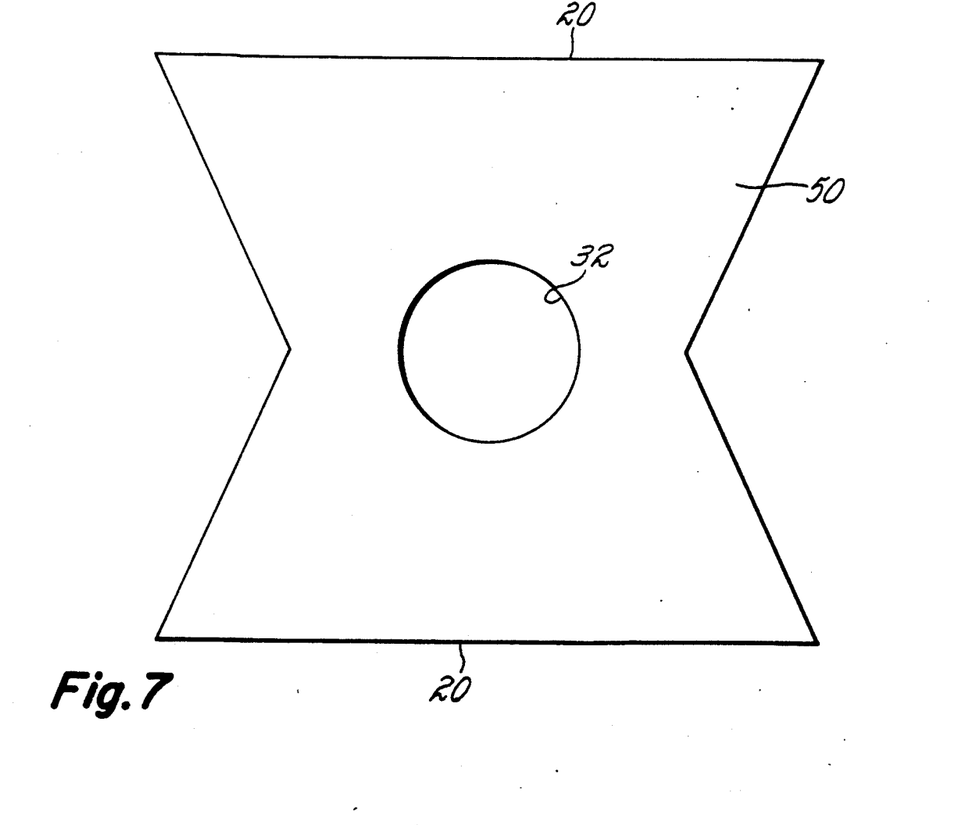

In each of the configurations shown in FIGS. 4 through 8, the same utilization of the flat surface of the bore 32 and the same consideration for the placement of the bore 32 is utilized as was done in FIGS. 1 and 2; in other words, the bore 32 is placed so as to achieve the optimum efficiency in light output by means of the optical coupling device 40 or 50. Additionally, as an alternative to providing the reflective coating material at the outer equatorial surfaces of the optical coupling device 40 or 50, as shown in FIGS. 4 and 6, it is possible to place a small amount of the reflective coating material 52 on portions of the flat surface of the bore 32 to prevent light losses at the corner portions of the optical coupling devices 40 or 50.

Figure 8:
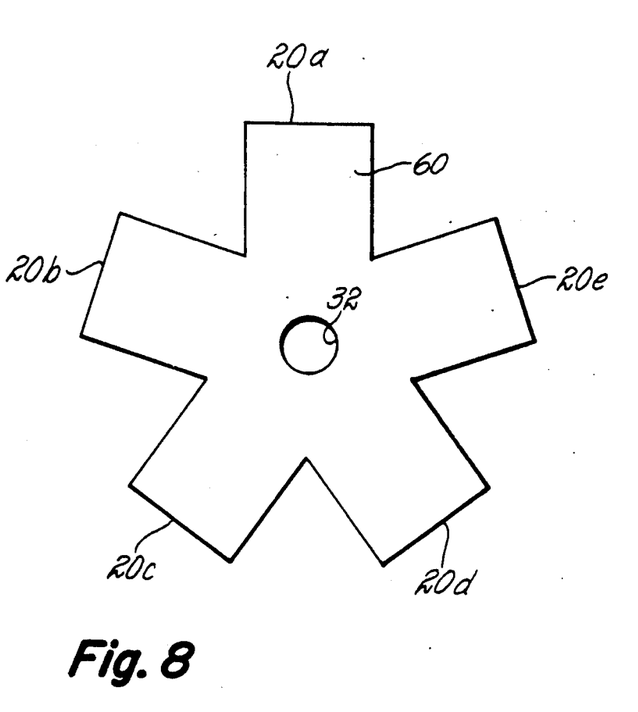

Another embodiment of a solid optical coupling device 60 achieving an improved coupling between a light source 14 and a light distribution arrangement 16 is by use of a star-shaped configuration illustrated in FIG. 8 and whose performance characteristics are listed in the following Table 3.

TABLE 3

| Solid Coupler | Leg | Spherical Candela | Lumens (SC dl × 4π) | Lumens per mm² | Efficiency (1675 L) |
|---|---|---|---|---|---|
| Star | 1 | 20.7 | 260 | 2.9 | 16% |
| | 2 | 22.3 | 280 | 3.3 | 17% |
| | 3 | 18.7 | 235 | 2.9 | 14% |
| | 4 | 21.0 | 264 | 3.1 | 16% |
| | 5 | 20.3 | 255 | 2.8 | 15% |
| | TOT | 103 | 1294 | | 77% |
| | AVE | 20.6 | 260 | 2.9 | 16% |

It can be appreciated that by providing a number of different apertures 20a, 20b, 20c, 20d, and 20e, in a star-shaped configuration, the optical coupling device 60 achieves a cumulative efficiency which is substantially greater than that achieved for either the one or two-apertured configurations of the previous embodiments. However, similar to the previous embodiments, the optical coupling device 60 of FIG. 8 utilizes the same principles relating to the configuration and placement of the bore 32 as was utilized in the previous embodiments. Additionally, the optical coupling device 60 as well utilizes the reflective coating material at the corner portions as does the previous embodiments although, whereas the previous embodiments provided the reflective coating material on all corner portions, for the star configuration of FIG. 8, the reflective coating material need not be disposed on inside corner portions since such inside corners exhibit total internal reflectance properties.

Although the hereinabove described embodiments of the invention constitute the preferred embodiments, it can be appreciated that modifications can be made thereto without departing from the scope of the invention as set forth in the appended claims.

What we claim as new and desire to secure by letters patent of the United States is:

1. An arrangement for coupling light from a light source to a light transmitting arrangement comprising:

a solid optical coupler element constructed of a material having a high transmittance value in the visible region;

said solid optical coupler element being construction in a shape such that the length and width of a first surface are substantially greater than the depth of said solid optical coupler element; said width being effective in controlling the spread of light exiting an aperture formed in said optical coupler, and said length being effective in the dissipation of thermal energy between the light source and said aperture;

said aperture being formed in said optical coupler element so as to allow light to be communicated through said optical coupler element to said light transmitting arrangement;

a bore formed in said solid optical element and being sized such that said light source fits therein in a contacting relation to an inner surface surrounding said bore; and wherein said inner surface surrounding said bore is optically smooth such that light from said light source is transmitted into said solid optical element thereby.

2. A light coupling arrangement as set forth in claim 1 wherein said bore is formed in said solid optical coupler element at a right angle relative to said first surface.

3. A light coupling arrangement as set forth in claim 2 wherein said first surface and a second surface parallel to said first surface are polished so as to achieve a total internal reflectance thereby, said optical coupler element further having a peripheral surface associated with said depth of said optical coupler element, said peripheral surface also having portions thereof polished so as to provide total internal reflectance thereby.

4. A light coupling arrangement as set forth in claim 3 wherein said peripheral surface has corners formed thereon and wherein said corners are coated with an optical reflecting material.

5. A light coupling arrangement as set forth in claim 3 wherein said aperture is formed on said peripheral surface.

6. A light coupling arrangement as set forth in claim 2 wherein said solid optical coupler element has a peripheral surface, a portion of which is formed in a parabolic shape, said peripheral surface further having a spherical shape formed along a portion thereof, said spherical shaped portion and said parabolic shaped portion being cooperatively engaged so as to direct light output to said aperture also formed along a portion of said peripheral surface.

7. A light coupling arrangement as set forth in claim 2 wherein said solid optical coupler element is formed in a substantially star-shaped manner whereby a plurality of leg portions extend radially outward from a central portion in which said bore is formed.

8. A light coupling arrangement as set forth in claim 7 wherein said aperture are formed at the ends of each of said plurality of leg portions associated with said star-shaped solid optical coupler element.

9. A light coupling arrangement as set forth in claim 1 further comprising an upper and a lower hollow leg portion extending respectively from each end of said bore, said upper and lower leg portions cooperatively engaging said bore such that, together with said inner surface surrounding said bore, form a lamp envelope in a manner so as to enable construction of said light source integrally with said solid optical coupler element.

10. A light coupling arrangement as set forth in claim 1 wherein said aperture is formed along a portion of an equatorial surface, said equatorial surface being comprised of the entire surface formed along the edge of said optical coupler element perpendicular to said first surface and corresponding in height to said depth of said optical coupler element.

11. A light coupling device for coupling light output from a light source to a light distribution arrangement comprising:

a solid optical coupling element constructed of a material having a high transmittance value in the visible region;

said solid optical coupling element being shaped in a substantially planar manner such that the width and length of a first surface are perpendicular to the depth of said optical coupler, said width being effective in controlling the spread of light exiting an aperture formed in said optical coupler, and said length being effective in the dissipation of thermal energy between the light source and said aperture;

a bore formed in said solid optical coupling element and being of a size to allow said light source to be disposed therein, said bore having an essentially flat inner surface;

said aperture being formed along a surface of said solid optical coupling element and being effective for allowing light to be communicated through said optical coupling element to said light distribution arrangement; and wherein at least a portion of the surfaces of each of said bore and said aperture are optically smooth so as to allow for the efficient transmittance of light through said solid optical coupling element.

12. A light transmitting arrangement as set forth in claim 11 wherein said bore is formed in said solid optical coupler element at a right angle relative to said first surface.

13. A light transmitting arrangement as set forth in claim 12 wherein said first surface and a second surface parallel to said first surface are polished so as to achieve a total internal reflectance thereby, said optical coupler element further having a peripheral surface associated with said depth of said optical coupler element, said peripheral surface also having portions thereof polished so as to provide total internal reflectance thereby.

14. A light transmitting arrangement as set forth in claim 13 wherein said peripheral surface has corners formed thereon and wherein said corners are coated with an optical reflecting material.

15. An arrangement for transmitting light from a light source to a position remote from said light source comprising:

an optical coupling element having associated therewith, a high transmittance value in the visible region; said solid optical coupling element being shaped in a substantially planar manner, such that the width and length of a first surface are perpendicular to the depth of said optical coupler, said with being effective in controlling the spread of light exiting an aperture formed in said optical coupler, and said length being effective in the dissipation of thermal energy between a light source and said aperture;

a bore formed in said optical coupling element in which said light source is disposed;

said aperture being disposed on said optical coupling element so as to allow light generated by said light source to be transmitted through said optical coupling element;

light distribution means cooperatively engaging said aperture such that the light transmitted through said optical coupling element is transmitted such position remote from said light source; and wherein said light source is cooperatively associated with said bore formed in said optical coupling device whereby said bore is sealed in a manner such that the inner surface of said bore forms the outer envelope in which light generated from said light source is contained.

16. A light transmitting arrangement as set forth in claim 15 wherein said bore is formed in said solid optical coupler element at a right angle relative to said first surface.

17. A light transmitting arrangement as set forth in claim 16 wherein said first surface and a second surface parallel to said first surface are polished so as to achieve a total internal reflectance thereby, said optical coupler element further having a peripheral surface associated with said depth of said optical coupler element, said peripheral surface also having portions thereof polished so as to provide total internal reflectance thereby and further wherein said peripheral surface has corners formed thereon.

18. A light transmitting arrangement as set forth in claim 17 further comprising a reflective coating disposed on a portion of said bore so as to prevent light from being directed to said corner portions.

* * * * *